Oct. 18, 1938.   T. H. MAYFIELD   2,133,555
SEALING DEVICE
Filed April 2, 1937

Inventor.
T. H. Mayfield
By C. A. Snow & Co
Attorneys.

Patented Oct. 18, 1938

2,133,555

UNITED STATES PATENT OFFICE 2,133,555

SEALING DEVICE

Thomas H. Mayfield, Roby, Tex.

Application April 2, 1937, Serial No. 134,619

2 Claims. (Cl. 151—9)

This invention relates to nut and bolt locks designed for use in securing and sealing license tags to their brackets, sealing ballot boxes, safety deposit boxes, or similar containers, to prevent the ready opening or removal of the articles secured thereby.

Another object of the invention is to provide a sealing nut and bolt lock for universal use, which can only be removed by cutting and destroying the nut or bolt.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
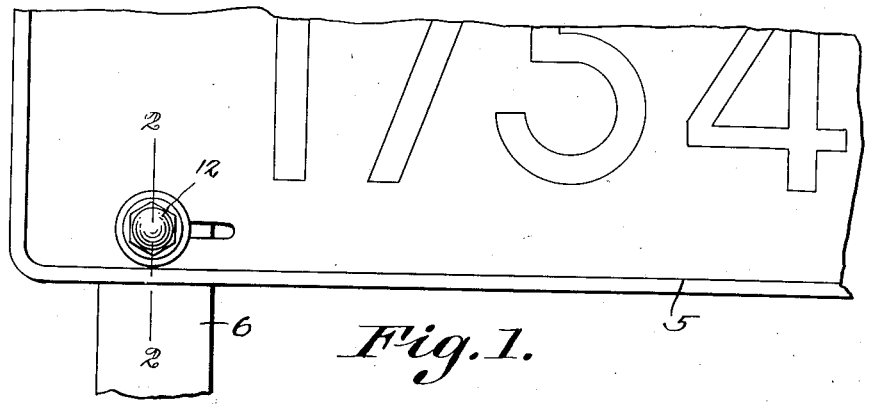
Figure 1 is a fragmental elevational view of a license tag, illustrating a nut and bolt lock, constructed in accordance with the invention, as securing the license tag to its bracket.
Figures 2, 3:
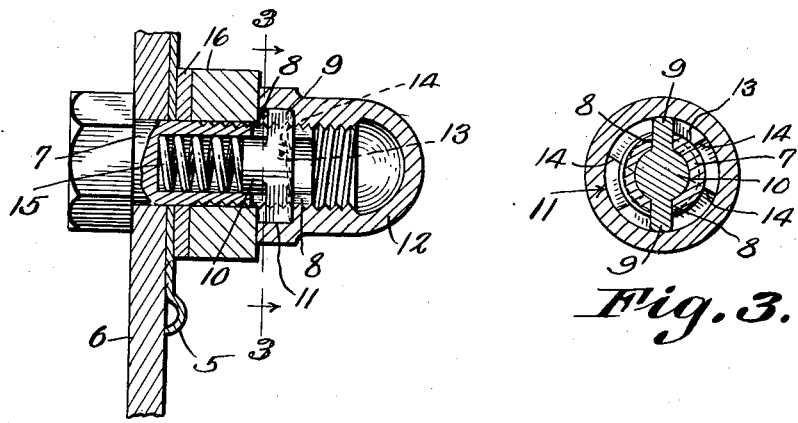
Figure 2 is a longitudinal sectional view through the nut and bolt lock, taken on line 2—2 of Figure 1.
Figure 3 is a sectional view taken on line 3—3 of Figure 2.

Referring to the drawing in detail, the reference character 5 designates a motor vehicle license plate, which is secured to the bracket 6, by means of a bolt and nut, constructed in accordance with the invention.

As shown, the bolt which is headed, is indicated by the reference character 7, and is provided with a central longitudinal bore, extending from the free end of the bolt. Slots indicated by the reference character 8, are formed in the bolt, and extend inwardly from the free end thereof, for the reception of the lugs 9, that extend laterally from the pin 10, which is of a diameter to closely fit within the bore of the bolt.

These lugs 9 are of lengths to extend appreciable distances beyond the side or outer surface of the bolt 7, where they normally lie within the enlarged portion 11 of the cap nut 12. Formed within the enlarged portion 11 of the cap nut 12, are cam surfaces indicated by the reference character 13, which are formed to provide shoulders 14 at the ends thereof, the lugs 9 moving over the cam surfaces, when the nut is rotated in a clockwise direction, the lugs engaging the shoulders 14, when pressure is directed to the nut in an anti-clockwise direction, thereby preventing the removal of the nut.

A coiled spring indicated by the reference character 15 is positioned within the bore of the bolt, and contacts with the pin 10, normally urging the pin outwardly, to cause the operation of the lugs, as described.

Washers indicated by the reference character 16, are positioned between the nut 12 and license plate 15, insuring a close fit between the nut and license plate.

Figure 4:
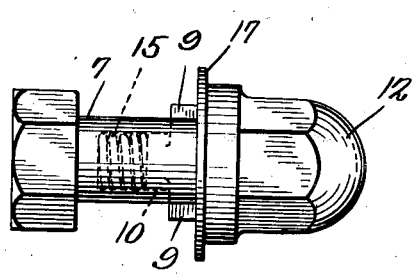
Figure 4 is an elevational view of the bolt and nut assembled, prior to the positioning of the bolt and nut.

As shown by Figure 4 of the drawing, a washer indicated by the reference character 17 is positioned over the free end of the bolt, the washer contacting with the lugs 9 of the pin 10, to prevent the lugs from moving into the enlarged portion of the cap nut 12, prior to the positioning of the bolt to accomplish its purpose.

From the foregoing it will be seen that due to the construction shown and described, it will be necessary to cut the nut or bolt to destroy them in order to disconnect the bolt from the member with which it is used.

While I have shown and described the device as employed in securing a license plate to its bracket, it is contemplated to use the bolt and nut lock, for closing and sealing ballot boxes, safety deposit boxes, or similar containers, wherein it is necessary to absolutely seal the contents.

Having thus described the invention what is claimed is:

1. In a device of the character described, a bolt having a threaded portion formed with a longitudinal bore and having lateral slots, a spring-pressed pin mounted within the bore, lugs formed on the pin and extending laterally through the slots, a cap threaded on the bolt, and said cap having ratchet faces formed therein for engaging the lugs of the pin to prevent removal of the cap.

2. In a device of the character described, a bolt having a threaded portion formed with a longitudinal bore and having lateral slots, a spring-pressed pin operating within the bore, lugs on the pin, said lugs extending through said slots, a cap having internal threads and adapted to be positioned on the threaded portion of the bolt, said cap having a recessed inner end formed with a ratchet face cooperating with the lugs to prevent removal of the cap.

THOMAS H. MAYFIELD.